United States Patent
Raj et al.

(10) Patent No.: US 10,168,229 B2
(45) Date of Patent: Jan. 1, 2019

(54) EMI/RF SHIELDING OF THERMOCOUPLES

(71) Applicant: Applied Materials, Inc., Santa Clara, CA (US)

(72) Inventors: Govinda Raj, Bangalore (IN); Bopanna Ichettria Vasantha, Bangalore (IN); Ashish Bhatnagar, Fremont, CA (US); Cariappa Baduvamanda, Bangalore (IN)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 15/719,205

(22) Filed: Sep. 28, 2017

(65) Prior Publication Data

US 2018/0017447 A1    Jan. 18, 2018

Related U.S. Application Data

(62) Division of application No. 12/838,455, filed on Jul. 17, 2010, now Pat. No. 9,823,133.

(60) Provisional application No. 61/226,927, filed on Jul. 20, 2009.

(51) Int. Cl.
   *G01K 7/00* (2006.01)
   *G01K 7/02* (2006.01)
   *G01K 1/08* (2006.01)

(52) U.S. Cl.
   CPC ......... *G01K 7/02* (2013.01); *G01K 1/08* (2013.01)

(58) Field of Classification Search
   USPC .................................................. 374/179, 163
   See application file for complete search history.

(56) References Cited

U.S. PATENT DOCUMENTS

| | | | |
|---|---|---|---|
| 7,080,941 B1* | 7/2006 | Benjamin | G01K 1/08 374/141 |
| 2006/0272772 A1 | 12/2006 | Al-Bayati et al. | |
| 2006/0275933 A1 | 12/2006 | Du Bois et al. | |
| 2006/0289795 A1 | 12/2006 | Dubois et al. | |
| 2007/0265379 A1* | 11/2007 | Chen | B82Y 30/00 524/404 |

* cited by examiner

*Primary Examiner* — Mirellys Jagan
(74) *Attorney, Agent, or Firm* — Patterson + Sheridan, LLP

(57) ABSTRACT

Embodiments disclosed herein generally relate to a temperature sensor disposed in an apparatus. In many semiconductor, liquid crystal display, solar panel or organic light emitting display fabrication processes, RF power is utilized to either ignite a plasma within the processing chamber or to provide supplemental energy to the process. Temperature control during many processes may be beneficial in order to produce a consistent product. Temperature sensors or thermocouples are sometimes utilized to measure the temperature of a substrate within a processing chamber. The RF power may have a negative impact on the temperature sensor. By coating the temperature sensor with a nanoparticle based metal coating, such as a silver coating, the negative impacts of the RF power on the temperature sensor may be reduced without contaminating the process, and an accurate temperature measurement may be obtained.

17 Claims, 3 Drawing Sheets

EMI/RF SHIELDING OF THERMOCOUPLES

CROSS-REFERENCE TO RELATED APPLICATIONS

This application is a divisional application of co-pending U.S. patent application Ser. No. 12/838,455, filed Jul. 17, 2010, which claims benefit of U.S. Provisional Patent Application Ser. No. 61/226,927, filed Jul. 20, 2009, each of which is herein incorporated by reference in its entirety.

BACKGROUND OF THE INVENTION

Field of the Invention

Embodiments disclosed herein generally relate to a temperature sensor disposed in an apparatus.

Description of the Related Art

Semiconductor device geometries have dramatically decreased in size since such devices were first introduced several decades ago. Since then, integrated circuits have generally followed the two year/half-size rule (often called Moore's Law), which means that the number of devices that will fit on a chip doubles every two years. Today's fabrication plants are routinely producing devices having 45 nanometer feature sizes, and tomorrow's plants will soon be producing devices having even smaller geometries.

Thermal and plasma annealing processes are sometimes used to manufacture semiconductor devices. Thermal and plasma annealing processes may be performed at temperatures of less than about 400 degrees Celsius in order to prevent damage to other components of the substrate or device on which the low dielectric constant film is deposited. As a result, the ability to monitor the temperature at the substrate surface is beneficial to the annealing process. Further, industry production requirements dictate several criteria that should be met when selecting a temperature sensing device or thermocouple.

First, the junction of the thermocouple device should make direct, reliable thermal contact with the surface to be monitored. Otherwise, there is a thermal impedance between the thermocouple junction and the surface resulting in temperature readings more closely related to the material surrounding the thermocouple than to the actual surface temperature.

Second, the mass of material surrounding the thermocouple junction and holding it to the surface should be minimal. The effect of this material is to add thermal mass to the junction and insulation surface beneath the material, both of which cause the thermocouple to lag the true surface temperature.

Finally, the thermocouple surface should not introduce contaminants onto the surface being measured. While a number of thermocouple devices are currently known, they all use a ceramic tip to maximize temperature response. Unfortunately, using the ceramic tip against a surface, such as a silicon wafer surface, in an RF based process results in RF/EMI noise interference.

For the foregoing reasons, there is a need for a temperature measurement device with a good response time, reliable thermal contact, and comprising a material that won't contaminate the object whose temperature is measured.

SUMMARY OF THE INVENTION

Embodiments disclosed herein generally relate to a temperature sensor disposed in an apparatus. In many semiconductor, liquid crystal display, solar panel or organic light emitting display fabrication processes, RF power is utilized to either ignite a plasma within the processing chamber or to provide supplemental energy to the process. Temperature control during many processes may be beneficial in order to produce a consistent product. Temperature sensors or thermocouples are sometimes utilized to measure the temperature of a substrate within a processing chamber. The RF power may have a negative impact on the temperature sensor. By coating the temperature sensor with a nanoparticle based metal coating, such as a silver coating, the negative impacts of the RF power on the temperature sensor may be reduced without contaminating the process, and an accurate temperature measurement may be obtained.

In one embodiment, a thermocouple is disclosed. The thermocouple may comprise a thermocouple body having a first coating disposed over the thermocouple body. The first coating may comprise a first material. The thermocouple may also include a second coating disposed over the first coating. The second coating may comprise a second material different than the first material. The thermocouple may also comprise a third coating disposed over the second coating. The third coating may comprise a third material different than both the first material and the second material. In another embodiment, a thermocouple comprising a thermocouple body having a nano coating of silver thereon is disclosed.

In another embodiment, an apparatus for processing a substrate is disclosed. The apparatus may include a temperature sensor, a first coating disposed over the temperature sensor, the first coating comprising a first material and a second coating disposed over the first coating. The second coating may comprise a second material different than the first material. The apparatus may also include a third coating disposed over the second coating. The third coating may comprise a third material different than both the first material and the second material.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally relate to a temperature sensor disposed in an apparatus. In many semiconductor, liquid crystal display, solar panel or organic light emitting display fabrication processes, RF power is utilized to either ignite a plasma within the processing chamber or to provide supplemental energy to the process. Temperature control during many processes may be beneficial in order to produce a consistent product. Temperature sensors or thermocouples are sometimes utilized to measure the temperature of a substrate within a processing chamber. The RF power may have a negative impact on the temperature sensor. By coating the temperature sensor with a nanoparticle based metal coating, such as a silver coating, the negative impacts of the RF power on the temperature sensor may be reduced without contaminating the process, and an accurate temperature measurement may be obtained.

Figure 1:
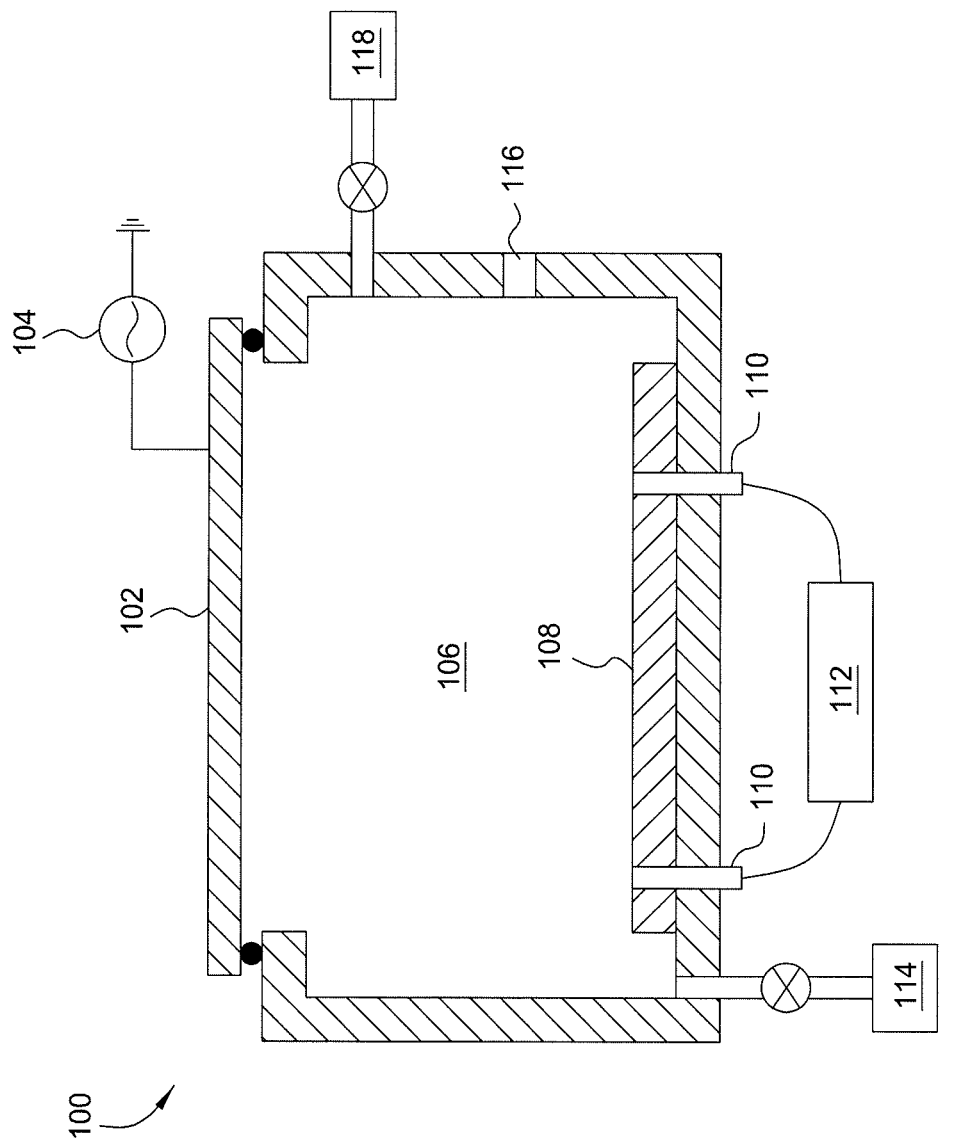
FIG. 1 is a schematic cross-sectional view of an apparatus having a plurality of temperature sensors disposed therein according to one embodiment.

FIG. 1 is a schematic cross-sectional view of an apparatus having a plurality of temperature sensors disposed therein according to one embodiment. The apparatus will be described in a generic sense without specific description to the type of chamber. However, it is to be understood that the apparatus may be any general processing chamber that is typical in the semiconductor, solar panel, liquid crystal display and organic light emitting display industries such as chemical vapor deposition (CVD), plasma enhanced chemical vapor deposition (PECVD), sputtering, etching and annealing chambers to name a few. Suitable chambers that may be used to practice the embodiments discussed herein may be obtained from Applied Materials, Inc., Santa Clara, Calif. It is to be understood that the embodiments discussed herein may be practiced in chambers obtained from other manufacturers as well.

The apparatus comprises a chamber 100 having an electrode 102 that is coupled to an RF power source 104. The electrode 102 may comprise a gas distribution showerhead, a sputtering target, etc. The electrode 102 may be disposed across a processing area 106 from a susceptor 108 upon which a substrate rests during processing. Processing gas may be introduced into the chamber 100 from a processing gas source 118 and evacuated from the chamber 100 with a vacuum pump 114. The substrate may be inserted and removed from the chamber 100 through a slit valve opening 116 that is present through a chamber wall.

In one embodiment, the susceptor 108 may have heating elements embedded therein and/or cooling channels embedded therein to permit the temperature of the susceptor 108 and thus, the substrate disposed thereon, to be adjusted. Additionally, heating lamps may be present either within the chamber 100 or outside the chamber 100 to anneal the substrate.

To monitor the temperature of the substrate during processing, one or more temperature sensors 110 or thermocouples may be coupled to the susceptor 108 and in contact with the substrate. The temperature sensors 110 measure the temperature of the substrate and provide feedback to a controller 112. The controller 112 receives the temperature information and may then control the heating and/or cooling of the substrate. It is to be understood that while two temperature sensors 110 have been shown, more or less temperature sensors 110 may be present.

When a plasma process is performed, a plasma environment is created in the chamber 100 for the purpose of depositing material onto the substrate or etching material from the substrate. The plasma is struck when the processing chamber 100 is at a very high vacuum level. Noble gases such as argon, helium, neon, etc. are introduced into the processing chamber 100 in the presence of a very high frequency RF field. The deposition or etching process is carried out at very high temperatures in the processing chamber 100.

For semiconductor processing, semiconductor wafers, such as silicon wafers, are placed on the susceptor 108 for processing. Heating lamps may be activated to heat the substrate. The RF power source 104 generates the high frequency RF field that is used to strike the plasma in the processing chamber 100 and maintain the plasma density during processing. During normal operation, the chamber 100 temperature may be between about 50 degrees Celsius and about 70 degrees Celsius. The susceptor 108, meanwhile, may be maintained at between about 400 degrees Celsius and about 480 degrees Celsius, depending upon the process.

For maintaining a regulated temperature on the substrate within the chamber 100, the temperature is continuously monitored and controlled. Hence, the susceptor 108 temperature is monitored and controlled. During the temperature measurement, RF/EMI (i.e., radio frequency/electromagnetic interference) noise may interfere with the signal and result in an inaccurate measurement of the temperature, damage of parts and equipment, low usage of the system and high mean time between failures (MTBF). The temperature sensors 110 and the connecting wires that are embedded within the susceptor 108 may be shielded with traditional EMI shields.

Inaccurate temperature measurement may result in equipment and substrate damage. The equipment and substrate damage may result in significant equipment downtime while the equipment is fixed. Field failure of susceptors is a chronic issue that results in customer dissatisfaction and has a high cost impact. Improper reading of temperatures, temperature spiking, and temperature mean instability are common issues with susceptors whose failure can be traced to improper grounding of the susceptor, the temperature sensor and interference of RF signals with the temperature sensor wires. The orientation of the temperature sensor leads with respect to the RF source also has an impact on the signal interference. The wires should have a diameter as small as possible and be as close to the susceptor top surface as possible to measure the temperature accurately with a minimum response time. Hence, increasing the sheath thickness (i.e., a coating on the temperature sensor) may increase the response time.

A nano silver coating may be the best solution to the above discussed problems. Silver has three times higher thermal conductivity and electrical conductivity as compared to ceramic tipped temperature sensors. The electrical conductivity of silver can eliminate the problem of RF interference and has an effective grounding of the EMI and ES (i.e., electrostatic) noise. The wires within the temperature sensor may be twisted to cancel the electromagnetic noise. Low resistance coating, even though thin, accurately connected without contaminations or holes or gaps helps reduce electrostatic noise. Higher uniformity and accuracy in processing may be achieved since the response time for the temperature sensor may be reduced as compared to ceramic tipped temperature sensors. Complete shielding and separate grounding may improve the rejection of EMI and ES noise. The application of nanoparticles on the metal sheath of the temperature sensor and the connecting wires fills up any voids in the joints on the sheath and on the grounding shield of the wires and significantly reduces RF/EMI noise with enhanced RF grounding and faster response times compared to ceramic tipped temperature sensors. A coating of ceramic material, such as alumina or aluminum nitride, may be further applied if desired for preventing particle contamination in the processing chambers as few processes utilize processing or cleaning gases, such as fluorine based gases, react with silver. The nano coating of silver is applied on the shielding and on the metal cover of the adapter of the temperature sensor by various processes such as dipping, spraying and firing to improve process accuracy, life of parts, RF grounding, measurement response time and measurement accuracy. It is to be understood that while silver has been described, other metals such as copper, aluminum, gold, diamond with high thermal conductivity and low thermal electrical resistance, and also microwave-absorption materials such as cobalt, iron, zinc oxide particles and its carbon package particles may be utilized.

The nano silver coating on the temperature sensor has many benefits. The nano coating can ground/drain the electromagnetic noise since it has a high electrical conductivity and a higher thermal conductivity than ceramic. The temperature sensor wires after the adaptor portion of the temperature sensor may be coated with nano silver and twisted to cancel the electromagnetic noise. The nano silver coating is a low resistance coating even though it is thin. The nano coating permits the temperature sensor to accurately connect to the substrate without contaminations or holes or gaps therebetween. The separate grounding of the sheath will improve the EMI and ES rejection and also in low frequency and DC noise. The response time will be greatly reduced as the thermal conductivity is very high compared to ceramic material. Higher uniformity and accuracy in the process can be achieved because the response time is reduced compared to ceramic tipped temperature sensors. Complete shielding and separate grounding can improve the rejection of EMI and ES noise. Since the electromagnetic noise source is confined to a particular area, the orientation of the temperature sensor relative to the RF source can minimize EMI coupling noise, similar to three way circulator designs. The response time is directly proportional to the diameter of the temperature sensor. As the thickness of the nano silver is very thin (i.e., about 0.5 micrometers to about 1 micrometer), there is no increase in response time. Encapsulating the nano silver coating wires and temperature sensor body will increase the life of the temperature sensor and prevent the silver from being introduced into the chamber as compared to ceramic. The average signal to noise ratio (SNR) value of the temperature sensor is increased further by nano coating and encapsulation. Improved temperature sensors may have a very high SNR (i.e., greater than about 30) that helps in accurate temperature measurement.

Therefore, EMI/RF radiation may be controlled by applying a nano silver coating onto the nickel sheath that is present on a temperature sensor. The thermal and electrical conductivity of the silver coating is three times more then that of nickel. Thus, the silver has properties of EMI shielding at higher temperatures that nickel does not. Suitable silver materials that may be used to coat the temperature sensor include TEC-PA-030, available from InkTec. The particle size for the silver coating may be between about 10 nanometers to about 50 nanometers. The silver coating may be deposited by numerous techniques including spray coating, dip coating and a printing and firing process. The printing and firing process may comprise coating transparent silver nanoparticles in the form of an ink onto the surface. Then, the ink is fired to evaporate and dry the silver organic transparent coating to form a self assembled silver monolayer. Metal ink uses a drying or firing process that is different than image printing. The drying or firing process is for evaporating other materials except for the metal (i.e., silver) in the ink. Unfired ink printing will have other materials, except for silver metal, interrupt an electronic current. Sintering will not be performed as sintering will grow the particle size.

Experiments have been conducted to show the beneficial effects of having a nano-silver coating over the temperature sensor in regards to response time. In the experiments, a control temperature sensor was utilized in which no coating was applied thereover, a temperature sensor in which a nano-silver coating having a particle size of 10 nm was deposited thereover and a temperature sensor in which a nano-silver coating having a particle size of 20 nm was deposited thereover were utilized. The temperature to be measured was 674.9 degrees Kelvin. The control temperature sensor having no coating thereover took 0.552 seconds to register the temperature, the temperature sensor having a nano-silver coating with a particle size of 10 nm took 0.44 seconds and the temperature sensor having a nano-silver coating with a particle size of 20 nm took 0.368 seconds to register the temperature. Thus, a nano-silver coated temperature sensor having a particle size of 10 nm had an improvement of over 20 percent response time relative to an uncoated temperature sensor. A nano-silver coated temperature sensor having a particle size of 20 nm performed even better with more than a 33 percent response time increase relative to an uncoated temperature sensor. An increase in response time provides more accurate, timely measurements that may reduce damage to substrates and may increase throughput. Therefore, it is clear that the increase in response time afforded by utilizing a nano-silver coating over a temperature sensor is beneficial.

Experiments were also conducted to show the increase in thermal conductivity of utilizing a nano-silver coating on a temperature sensor. In a first experiment, a temperature sensor having an uncoated (i.e., Ni 200) material and a nano-silver coated temperature sensor were tested. The temperature sensors were tested for their thermal conductivity at 200 degrees Celsius. The uncoated temperature sensor had a thermal conductivity of 61 W/mK while the nano-silver coated temperature sensor had a thermal conductivity of 68.70 W/mK. Thus, at 200 degrees Celsius, the nano-silver coated temperature sensor had an 11.21 percent increase in thermal conductivity relative to the uncoated temperature sensor. A second experiment was conducted in which an uncoated temperature sensor and a nano-silver coated temperature sensor were tested to determine their thermal conductivity at 480 degrees Celsius. The uncoated temperature sensor had a thermal conductivity of 57 W/mK while the nano-silver coated temperature sensor had a thermal conductivity of 63.17 W/mK. Thus, at 480 degrees Celsius, the nano-silver coated temperature sensor had a 9.77 percent increase in thermal conductivity relative to the uncoated temperature sensor.

Figure 2A:
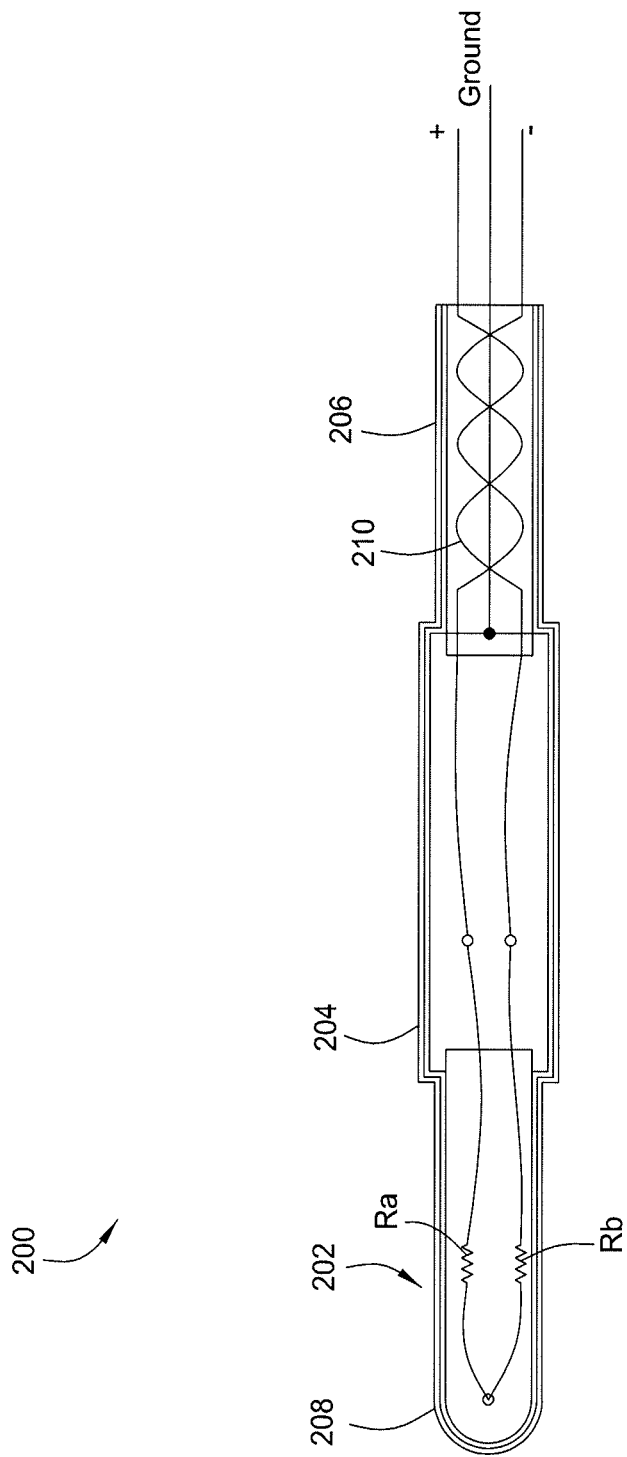
FIG. 2A is a schematic cross-sectional view of a temperature sensor according to one embodiment.
Figure 2B:
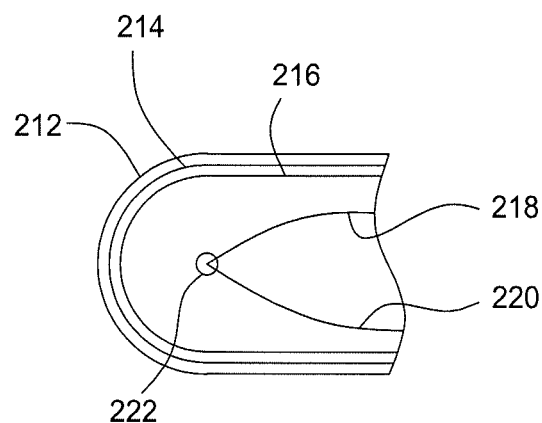
FIG. 2B is a schematic close-up view of FIG. 2A.

FIG. 2A is a schematic cross-sectional view of a temperature sensor 200 according to one embodiment. FIG. 2B is a schematic close-up view of FIG. 2A. The temperature sensor 200 includes a probe portion 202, an adaptor potting area 204 and a wire shielded area 206. The wires 210 that transmit the measured temperature to the controller are twisted in the wire shielded area 206. The probe portion 202, adaptor potting area 204 and the wire shielded area 206 may all be coated with a multi-layer coating 208.

FIG. 2B shows the details of the multi-layer coating on the temperature sensor 200. A first layer 216 is the inner most layer. In one embodiment, the first layer 216 may comprise a metal. In another embodiment, the first layer 216 may comprise a ferromagnetic material. In another embodiment, the first layer 216 may comprise a material selected from the group consisting of nickel, iron, cobalt, copper, aluminum, gold, and diamond with high thermal conductivity and low thermal electrical resistance, microwave-absorption materials such as zinc oxide particles and its carbon package particles, and combinations thereof. Multilayered coatings of material with high thermal conductivity and low electrical resistance can be used in proper combination over nickel sheath to improve the life of the thermocouple. The first layer 216 may have a thickness of between about 0.004 inch to about 0.021 inch. The first layer 216, as the innermost layer, may be coupled to the wires 218, 220 at a junction 222.

A second layer 214 may be deposited over the first layer 216. In one embodiment, the second layer 214 may have a thickness of between about 0.03 micrometers to about 30 micrometers. In one embodiment, the second layer 214 may comprise silver. The second layer 214 may comprise nanoparticles. In one embodiment, the nanoparticles of the second layer 214 may have a particle diameter of between about 10 nanometers to about 50 nanometers. The second layer 214 may be deposited over the first layer 216 by various deposition processes. One such deposition process is spray coating. Another deposition process that may be utilized is dip coating. Another deposition process that may be utilized is printing the nanoparticles of the second layer 214 onto the first layer 216 in the form of an ink. In one embodiment, the ink may comprise organic materials. The ink contains the nanoparticles therein. The deposited ink may be transparent in one embodiment. In one embodiment, the ink may be deposited onto the first layer 216 by printing. In another embodiment, the ink may be simply coated onto the first layer 216. Once the ink is deposited onto the first layer 216 by printing, the second layer 214 is then fired or exposed to a flame to evaporate and dry the nanoparticles. The organic material of the ink evaporates off and the remaining nanoparticles are assembled in a monolayer. In the case of silver, silver nanoparticles remain on the first layer 216 as a monolayer. The second layer 214, because it is a monolayer of nanoparticles, fills in any gaps within the first layer 216 and thus effectively shields the first layer 216 from EMI and RF radiation.

After the second layer 214 is deposited over the first layer 216, an optional third layer 212 may be deposited over the second layer 214. The third layer 212 may be desirable in certain situations where the material of the second layer 214 should not be exposed to the processing environment for contamination purposes. However, if the material of the second layer 214 is not harmful and will not contaminate the processing environment either during processing or cleaning, the third layer 212 may be eliminated. When present, the third layer 212 may comprise a ceramic material. In one embodiment, the ceramic material may comprise aluminum oxide. In another embodiment, the ceramic material may comprise aluminum nitride. In one embodiment, the third layer 212 may have a thickness of between about 0.03 micrometers to abut 20 micrometers.

Figure 2C:
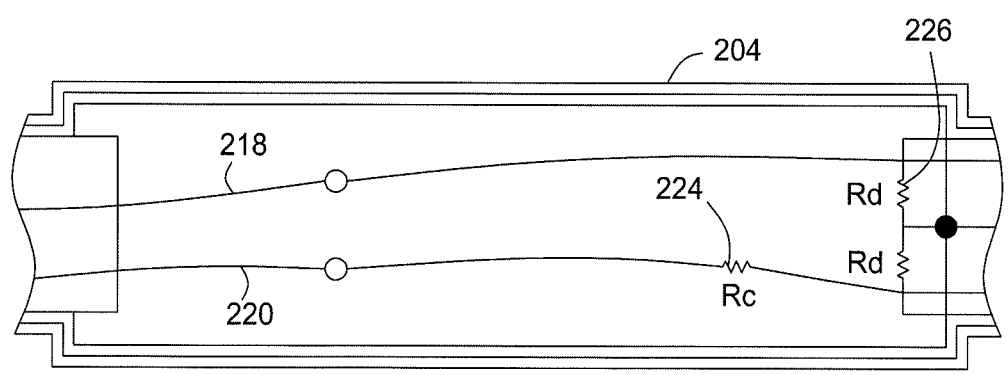
FIG. 2C is a schematic close-up view of the temperature sensor of FIG. 2A.

FIG. 2C is a schematic close-up view of the temperature sensor of FIG. 2A. The adaptor potting area 204 is shown in greater detail including the chromel wire 218 and the alumel wire 220. FIG. 2A shows a resistor Ra along the chromel wire 218 and a resistor Rb along the alumel wire 220. FIG. 2C shows a third resistor Rc along the alumel wire 220 within the adaptor potting area 204 as well as two resistors Rd connected in series between the chromel wire 218 and the alumel wire 220. The third resistor Rc creates a balanced circuit such that Rc=Ra−Rb. The two resistors Rd in series create a high resistance connection between the wires 218, 220 such that Rd>=1000 (Ra−Rb).

The wires 218, 220 may each be coated with not only an insulative coating, but also a metal coating over the insulating coating. In one embodiment, the metal coating may comprise a ferromagnetic material. In another embodiment, the metal coating may comprise nickel, iron, cobalt and combinations thereof. The metal coating may shield the wires 218, 220 from RF fields and electromagnetic interference. As shown in FIG. 2A, the wires 218, 220 may be wrapped around each other in the wire shielded area 206. By wrapping the wires 218, 220, any electromagnetic noise picked up by the wires 218, 220 may cancel each other.

By depositing a metal monolayer comprising nanoparticles over the inner metal layer, the RF and EMI shielding of a temperature sensor may be improved and accurate temperature measurements may be made. An optional ceramic layer may be deposited over the monolayer if desired to prevent any contamination of the processing chamber by introduction of material of the monolayer.

While the foregoing is directed to embodiments of the present invention, other and further embodiments of the invention may be devised without departing from the basic scope thereof, and the scope thereof is determined by the claims that follow.

The invention claimed is:

1. An apparatus for processing a substrate, comprising:
a substrate support;
a temperature sensor, wherein the temperature sensor is disposed in the substrate support;
a first coating disposed over the temperature sensor, the first coating comprising a first material;
a second coating disposed over the first coating, the second coating comprising a second material different than the first material, wherein the second coating comprises silver, wherein the silver comprises silver nanoparticles; and
a third coating disposed over the second coating, the third coating comprising a third material different than both the first material and the second material.

2. The apparatus of claim 1, wherein the first coating comprises nickel.

3. The apparatus of claim 1, wherein the silver nanoparticles of the second coating a diameter of between about 10 nanometers to about 50 nanometers, and wherein the second coating has a thickness of between about 0.03 micrometers and about 30 micrometers.

4. The apparatus of claim 1, wherein the third coating comprises a ceramic material, wherein the ceramic material is selected from the group consisting of aluminum oxide, aluminum nitride and combinations thereof, and wherein the third coating has a thickness of between about 0.03 micrometers and about 30 micrometers.

5. The apparatus of claim 1, further comprising a plurality of wires disposed within the temperature sensor, wherein the plurality of wires are electrically insulated from one another, wherein the plurality of wires are twisted, and wherein the plurality of wires are coated with a nickel containing material.

6. The apparatus of claim 1, further comprising:
a processing chamber, wherein the substrate support and temperature sensor are disposed within the processing chamber;
an electrode disposed within the processing chamber; and
an RF power source coupled to the electrode.

7. An apparatus for processing a substrate, comprising:
a substrate support;
a temperature sensor, wherein the temperature sensor is coupled to the substrate support;
a first coating disposed over the temperature sensor, the first coating comprising a first material;
a second coating disposed over the first coating, the second coating comprising a second material different than the first material, wherein the second coating comprises silver, wherein the silver comprises silver nanoparticles; and
a third coating disposed over the second coating, the third coating comprising a third material different than both the first material and the second material.

8. The apparatus of claim 7, wherein the first coating comprises nickel.

9. The apparatus of claim 7, wherein the the silver nanoparticles have a diameter of between about 10 nanometers to about 50 nanometers, and wherein the second coating has a thickness of between about 0.03 micrometers and about 30 micrometers.

10. The apparatus of claim 7, wherein the third coating comprises a ceramic material, wherein the ceramic material is selected from the group consisting of aluminum oxide, aluminum nitride and combinations thereof, and wherein the third coating has a thickness of between about 0.03 micrometers and about 30 micrometers.

11. The apparatus of claim 7, further comprising a plurality of wires disposed within the temperature sensor, wherein the plurality of wires are electrically insulated from one another, wherein the plurality of wires are twisted, and wherein the plurality of wires are coated with a nickel containing material.

12. The apparatus of claim 7, further comprising:
a processing chamber, wherein the substrate support and temperature sensor are disposed within the processing chamber;
an electrode disposed within the processing chamber; and
an RF power source coupled to the electrode.

13. The apparatus of claim 7, wherein the temperature sensor is embedded within the substrate support.

14. An apparatus for processing a substrate, comprising:
a thermocouple comprising a thermocouple body having a nano coating of silver nanoparticles thereon and;
a plurality of wires disposed within the thermocouple body, the plurality of wires being coated with a nickel-containing material, wherein the plurality of wires are twisted.

15. The apparatus of claim 14, wherein the nano coating has a thickness of about 0.03 micrometers to about 30 micrometers.

16. The thermocouple of claim 14, wherein the thermocouple has a signal to noise ratio of greater than about 30.

17. The thermocouple of claim 14, wherein the thermocouple body, including the nano coating of silver nanoparticles, is encapsulated in a ceramic coating.

* * * * *